(12) United States Patent
Mayumi

(10) Patent No.: US 6,700,261 B2
(45) Date of Patent: Mar. 2, 2004

(54) MOTOR WITH IMPROVED STATOR CASING

(75) Inventor: Eiji Mayumi, Nagano (JP)

(73) Assignee: Sankyo Seiki Mfg. Co., Ltd., Nagano (JP)

( * ) Notice: Subject to any disclaimer, the term of this patent is extended or adjusted under 35 U.S.C. 154(b) by 58 days.

(21) Appl. No.: 09/865,053

(22) Filed: May 23, 2001

(65) Prior Publication Data

US 2002/0047383 A1 Apr. 25, 2002

(30) Foreign Application Priority Data

May 26, 2000 (JP) .................................... 2000-156867
May 26, 2000 (JP) .................................... 2000-156868

(51) Int. Cl.[7] .......................... H02K 5/00; H02K 37/04
(52) U.S. Cl. .......................... 310/91; 310/89; 310/49 R
(58) Field of Search ............................. 310/49 R, 91, 310/89, 71, 258

(56) References Cited

U.S. PATENT DOCUMENTS

| | | | | |
|---|---|---|---|---|
| 4,841,190 A | * | 6/1989 | Matsushita et al. ......... 310/257 |
| 5,121,017 A | * | 6/1992 | Yamamoto et al. ........... 29/596 |
| 5,705,864 A | * | 1/1998 | Takano et al. ................ 310/42 |
| 6,046,519 A | * | 4/2000 | Hanazumi et al. .......... 310/257 |
| 6,255,749 B1 | * | 7/2001 | Aoshima et al. ............ 310/254 |
| 6,541,886 B2 | * | 4/2003 | Mayumi ...................... 310/91 |
| 2002/0024265 A1 | * | 2/2002 | Mayumi ..................... 310/179 |

FOREIGN PATENT DOCUMENTS

| | | | | |
|---|---|---|---|---|
| JP | 02001339895 | * | 12/2001 | ......... H02K/37/04 |
| JP | 02001339901 | * | 12/2001 | ......... H02K/37/14 |
| JP | 02002010560 | * | 1/2002 | ......... H02K/37/14 |

* cited by examiner

Primary Examiner—Thomas M. Dougherty
Assistant Examiner—H. Y. Elkassabgi
(74) Attorney, Agent, or Firm—Hogan & Hartson, LLP

(57) ABSTRACT

A motor has a stator including a coil bobbin with winding sections to be wound by windings and a terminal section. The terminal section outwardly protrudes in a radial direction of the coil bobbin and has fixed protruded terminal pins that are to be connected to winding start sections and wiring end sections of the windings. A curled case is placed over an exterior of the windings of the stator. The curled case has end sections in the peripheral direction and an opening section defined by the end sections of the curled case. The terminal section protrudes through the opening section, and an opening angle of the opening section is less than one half of the entire periphery of a circle.

15 Claims, 7 Drawing Sheets

MOTOR WITH IMPROVED STATOR CASING

BACKGROUND OF THE INVENTION

1) Field of the Invention

The present invention relates to improvements on motors, and more particularly to improvements on stator casings of motors.

2) Related Art

FIG. 4 shows a conventional stepping motor. The stepping motor has a stator 51 that is formed from a coil bobbin 61 and a coil bobbin 62 disposed adjacent to one another in the axial direction. A coil 61a is wound around the coil bobbin 61 and a coil 62a is wound around the coil bobbin 62. An inner yoke 55 equipped with pole teeth 55a and an inner yoke 56 equipped with pole teeth 56a are disposed adjacent to one another between the coil bobbins 61 and 62. An outer yoke 57 equipped with pole teeth 57a and an outer yoke 58 equipped with pole teeth 58a are disposed outside in the axial direction of the coil bobbins 61 and 62. The outer yoke 57 is formed in a manner to cover the exterior side of the coil 61a, and the outer yoke 58 is formed in a manner to cover the exterior side of the coil 62a, such that the outer yokes 57 and 58 respectively serve as an exterior casing of the motor. A rotor 52 having a rotor shaft 53 is disposed within an internal peripheral surface of the stator 51 opposite to the pole teeth 55a –58a. A cap 54 is attached to one end face of the stator 51. A bearing 54a is disposed in the cap 54 such that the bearing 54a supports one end of the rotor shaft 53.

FIG. 5 shows an exterior view of the stepping motor. Opening sections 57b and 58b are provided in the external yokes 57 and 58 that serve as the motor casing, respectively. The terminal section 63 protrudes from a window section that is formed by the opening sections 57b and 58b. The terminal section 63 has terminal pins 63a, 63c, 63b and 63d fixedly provided at equal intervals thereon. The terminal pin 63a is connected to a winding start section of the winding 61a, the terminal pin 63c is connected to a winding end section of the winding 61a, the terminal pin 63b is connected to a winding start section of the winding 62a and the terminal pin 63d is connected to a winding end section of the winding 62a.

The motor thus constructed in a manner described above has a structure in which, as shown in FIG. 6, one end of the rotor shaft is supported by a frame. A channel shaped frame 65 is affixed to a stator 51.

As described above, one end of the rotor shaft 53 of the rotor 52 is supported by a bearing that is formed in the cap 54 on one side of the stator 51, and the other end of the rotor shaft 53 passes through the stator 51 and protrudes to a great extent on the other side. In other words, the rotor shaft 53 of the rotor 52 passes through a passing aperture 71a that is formed in a plane section 71 of the frame 65 that is affixed to the stator 51, and one end of the rotor shaft 53 is supported on a bearing 73 that is mounted on a plane section 72 of the frame 65 that opposes to the plane section 71. An external peripheral surface of a section of the rotary shaft 53 that protrudes on the side of the frame 65 defines a lead screw section 67.

The motor having the structure described above is assembled in the following manner. First, the frame 65 is affixed to one end surface of the stator 51. Then, as shown in FIG. 7, one end of the rotor shaft 53 of the rotor 52 is inserted in the stator 51 on the side where the frame 65 is not mounted (in a direction indicated by the arrow in FIG. 7). When the end of the rotor shaft 53 passes the internal surface of the stator 51 and the passing aperture 71a of the frame 65 and reaches the bearing 73 (see FIG. 6) that is mounted on the frame 65, the cap 54 is attached to the stator 51. In this manner, the motor is assembled.

In the motor having the structure described above, an exterior casing that encloses the exterior of the stator 51 is formed from external peripheral sections of the external yoke 57 equipped with the pole teeth 57a and the external yoke 58 equipped with the pole teeth 58a. The external casing has a relatively complex configuration, and is composed of two members that are divided up and down in the axial direction. In addition, connecting sections between the external yokes 57 and 58 are provided with the opening sections 57b and 58b, respectively. Therefore, when the external yokes 57 and 58 are disposed adjacent to each other in the axial direction, the opening sections 57b and 58b need to be carefully aligned with each other. Accordingly, a mold for making the external casing has a complex configuration, and the assembly efficiency is poor.

Also, in the above-described motor, when one end of the rotor shaft 53 of the rotor 52 is passed through the internal empty space within the stator 51 and protruded on the side of the frame 65, and is supported by the bearing 73 that is mounted on the frame 65, there is a risk that the lead screw section 67 collides with an internal surface of the passing aperture 71a that is formed in the plane section 71 of the frame 65. In other words, when the works described above are performed, the rotor shaft 53 needs to be maintained perpendicular to the plane section 71, and the center of the rotor shaft 53 needs to coincide with the center of the passing aperture 71a. These tasks are very difficult. Moreover, there is only a small difference between the diameter of the passing aperture 71a formed in the plane section 71 that serves as an affixing surface of the frame 65 to be affixed to the stator 51 and an external diameter of the lead screw 67. In addition, since the passing aperture 71a is punched out by a press machine, edges of the aperture may have burrs. Therefore, unless the works are carefully conducted, the rotor shaft 53 could be inserted with its center being eccentric with respect to the passing aperture 71a, as shown in FIG. 7. As a result, the lead screw section 67 may come in contact with the internal surface of the passing aperture 71a and scrape the burrs, which may clog the male screw of the lead screw 67 or damage the male screw of the lead screw section 67. As a result, when the male screw of the lead screw section 67 is damaged, noise may be generated due to the damage in the lead screw section 67 when the motor is driven. When the male screw of the lead screw section 67 is clogged with burrs, noise may likewise be generated or the motor may become inoperable during its operation.

SUMMARY OF THE INVENTION

It is an object of the present invention to provide a motor that can be readily manufactured and readily assembled with respect to a stator of the motor by simplifying the structure of an exterior casing of the motor.

It is another object of the present invention to provide a motor that can prevent damages on a lead screw section of a rotary shaft when the rotor is assembled, and also prevent generation of metal powder from burrs at a passing aperture of a frame or the lead screw section that may be scraped when the rotor is assembled.

In accordance with an embodiment of the present invention, a motor has a stator including a coil bobbin with winding sections to be wound by windings and a terminal section that outwardly protrudes in a radial direction of the coil bobbin and has fixed protruded terminal pins that are to be connected to winding start sections and wiring end sections of the windings. In one aspect of the embodiment of the present invention, a curled case covers an exterior of the windings of the stator. The curled case may preferably be formed by curling a flat metal plate along a peripheral direction of the stator. The curled case has end sections in the peripheral direction and an opening section defined by the end sections of the curled case. The terminal section protrudes through the opening section, and the opening section may preferably open at an opening arc angle defined by less than one half of the entire periphery of a circle (i.e., less than 180 degrees). Since an exterior casing of the motor is formed from the curled case, the exterior casing can be readily manufactured and readily assembled. Also, since the opening section of the curled case is formed to be less than one half of the entire periphery of a circle (i.e., less than 180 degrees), the curled case is readily retained by, for example, external peripheral sections of the yokes when it is placed over the stator. The curled case can be readily affixed to the yokes by, for example, welding or the like.

In accordance with one embodiment of the present invention, the coil bobbin has a structure in which the winding sections that are to be wound by the windings are disposed adjacent to each other in the axial direction, and the curled case is welded to external peripheral sections of the yokes that are made of metal and disposed between the winding sections. The opening section of the curled case may preferably open at an opening arc angle defined by one third of the entire periphery of a circle or less (i.e., 120 degrees or less). As a result, the opening section is narrowed to improve formation of magnetic circuits, and the magnetic circuits are formed more effectively as the curled case is welded to the yokes, and therefore the motor characteristics can be improved.

In accordance with another embodiment of the present invention, a motor comprises a stator and a rotor disposed opposite to the stator, the rotor having a rotor shaft that protrudes from at least one end of the stator and is supported by a frame that is affixed to one end face of the stator provided in the axial direction of the stator. The frame has a fixing surface to be affixed to the stator and the fixing surface of the frame has a passing aperture. In one aspect of the embodiment of the present invention, a cylindrical sleeve section for passing the rotor shaft is provided at an edge of the aperture formed in the stator, and the cylindrical sleeve section is inserted in the passing aperture of the frame. In another aspect of the embodiment of the present invention, the cylindrical sleeve section is formed from a material that has a lower hardness than that of the rotor shaft.

As a result, when the rotor is placed in the stator, the rotor shaft can be prevented from contacting the passing aperture of the frame. Also, even when the rotor shaft contacts the cylindrical sleeve section that extends in the passing aperture of the frame, the rotor central shaft is not damaged because the cylindrical sleeve section is formed from a material having a lower hardness than that of the rotor shaft.

Furthermore, in accordance with another embodiment of the present invention, a motor comprises a stator and a rotor disposed opposite to the stator, wherein the rotor has a metal rotor shaft that protrudes from at least one end of the stator and is supported by a metal frame that is affixed to one end face of the stator provided in the axial direction of the stator. In one aspect of the invention, the stator has a coil bobbin composed of a resin member and equipped with an aperture section disposed opposite to an external periphery of the rotor, and a yoke having pole teeth disposed opposite to the rotor. The yoke is integrally assembled with the coil bobbin by an insert forming method. The metal frame has a passing aperture that is disposed in a manner to overlap the aperture section of the coil bobbin for passing the rotary shaft. A cylindrical sleeve section that is formed integrally with the coil bobbin by a resin member is inserted in the passing aperture. The cylindrical sleeve section is provided at a peripheral edge of the aperture section of the coil bobbin.

As a result, when the rotor is placed in the stator, the metal rotor shaft can be prevented from contacting the passing aperture of the metal frame. Although there may be a possibility that the rotor shaft may contact the cylindrical sleeve section that extends in the passing aperture of the frame, the rotor central shaft is not damaged because the cylindrical sleeve section provided at the edge of the aperture section of the coil bobbin is formed integrally with the coil bobbin with a resin member.

In the embodiment described above, the measurement of the cylindrical sleeve section in the axial direction may be the same or greater than the measurement of the passing aperture in the axial direction. As a result, the internal peripheral surface of the passing aperture can be completely covered by the cylindrical sleeve section. Moreover, when the rotor is disposed in the stator, the metal rotor shaft can be more thoroughly prevented from contacting the passing aperture of the metal frame.

Also, in the embodiment described above, a convex section may be provided on the external surface of the cylindrical sleeve section, such that the convex section serves as a positioning section to be used when the frame is affixed to the stator. As a result, the frame and the stator can be affixed to each other with a high positional accuracy without having to provide a special positioning section on the end face of the stator.

Other features and advantages of the invention will be apparent from the following detailed description, taken in conjunction with the accompanying drawings that illustrate, by way of example, various features of embodiments of the invention.

DESCRIPTION OF PREFERRED EMBODIMENTS

Figure 1:
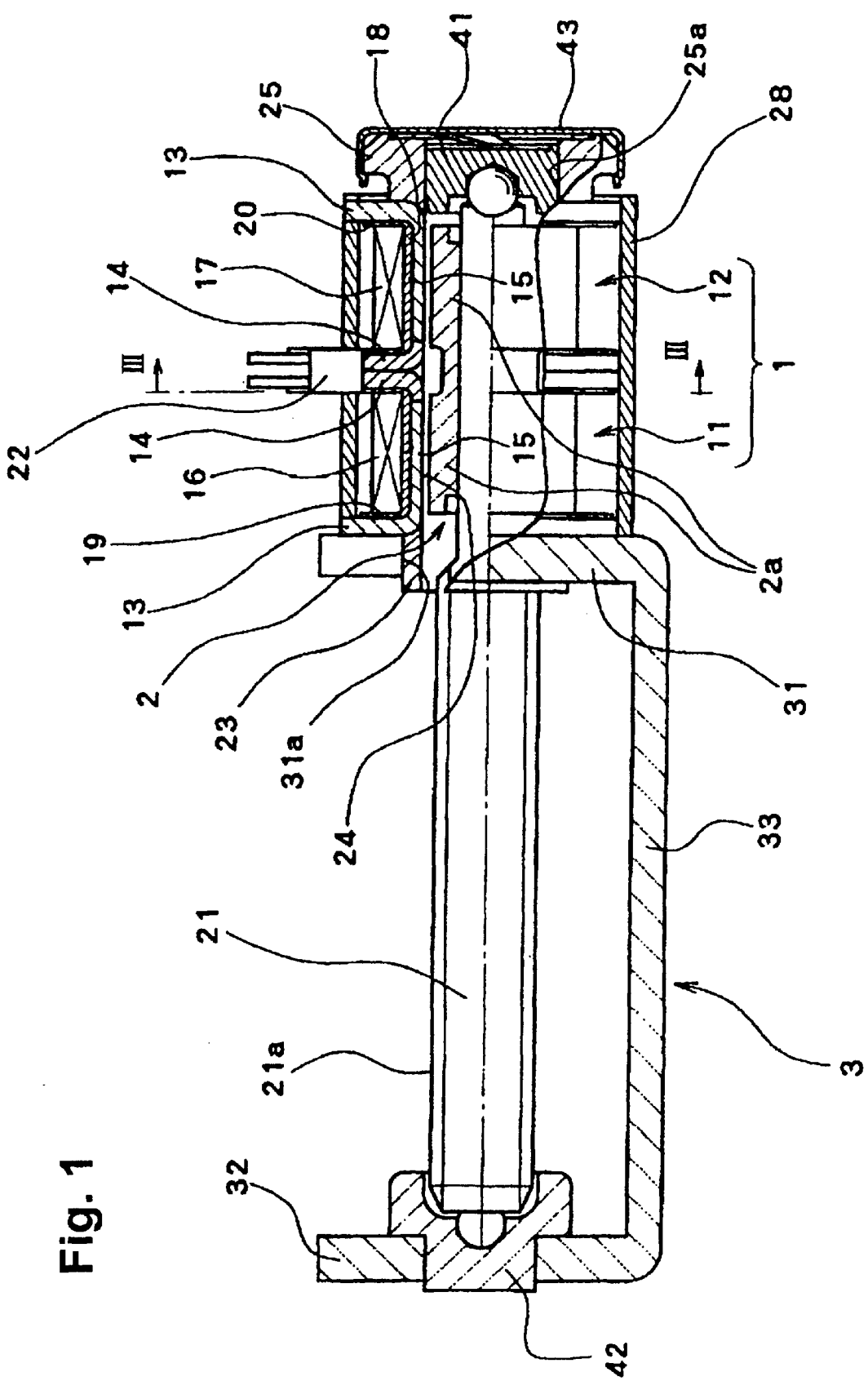
FIG. 1 shows a cross-sectional view of an entire structure of a motor in accordance with one embodiment of the present invention.
Figure 2:
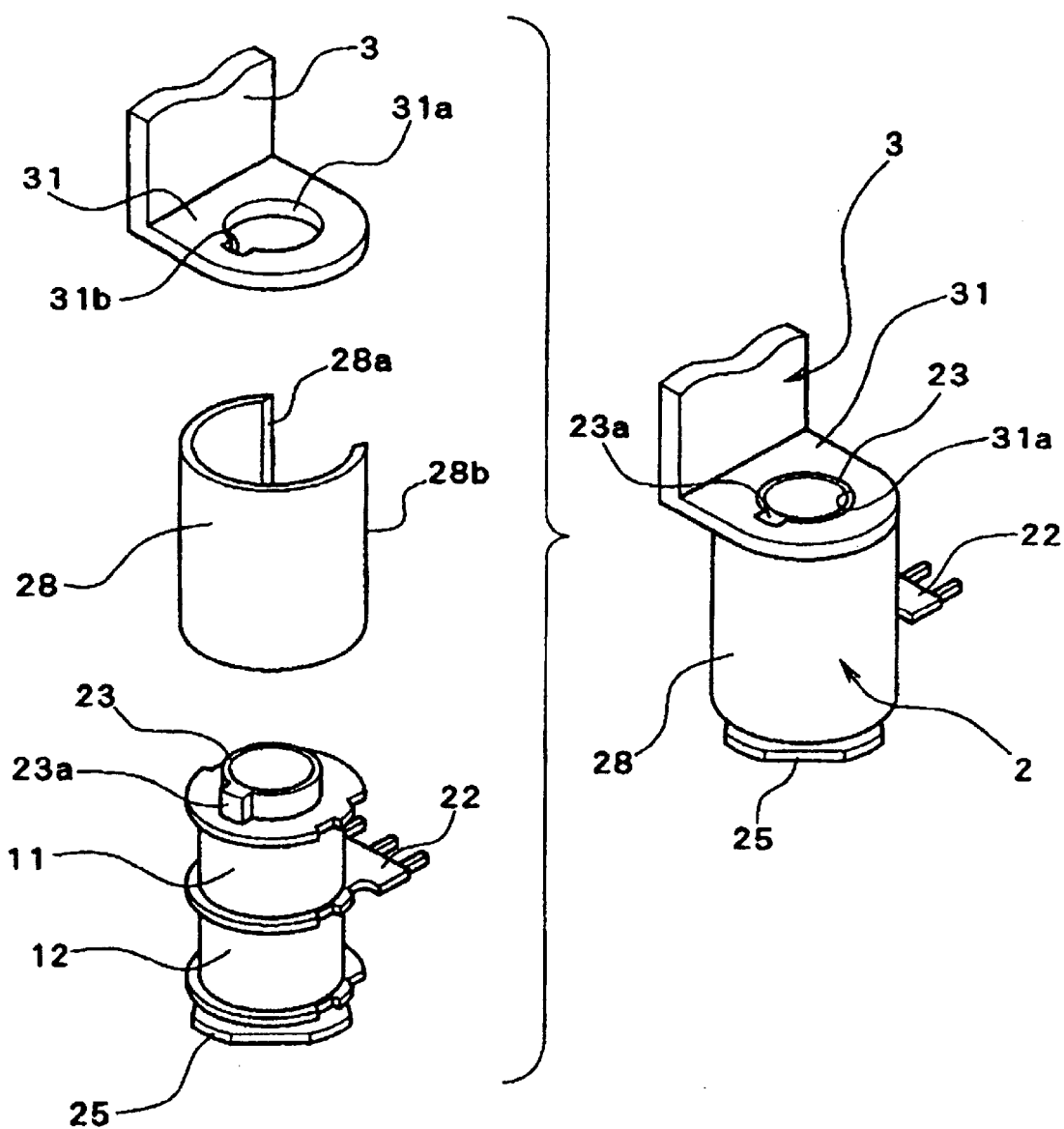
FIG. 2 shows an exploded perspective view of a stator that is a main portion of the motor of the embodiment and a part of a frame that is affixed to the stator.
Figure 3:
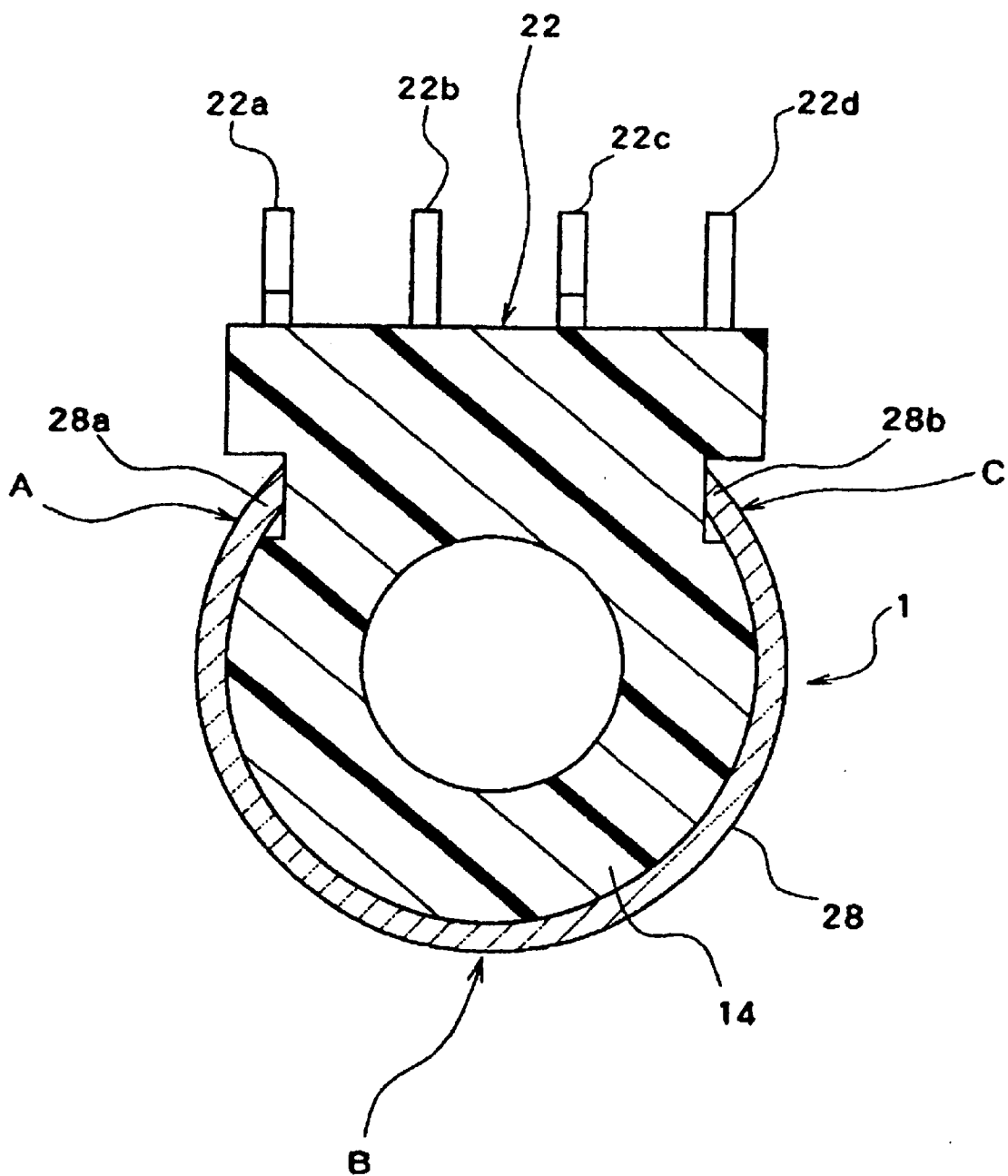
FIG. 3 shows a cross-sectional view taken along a line III—III.
Figure 4:
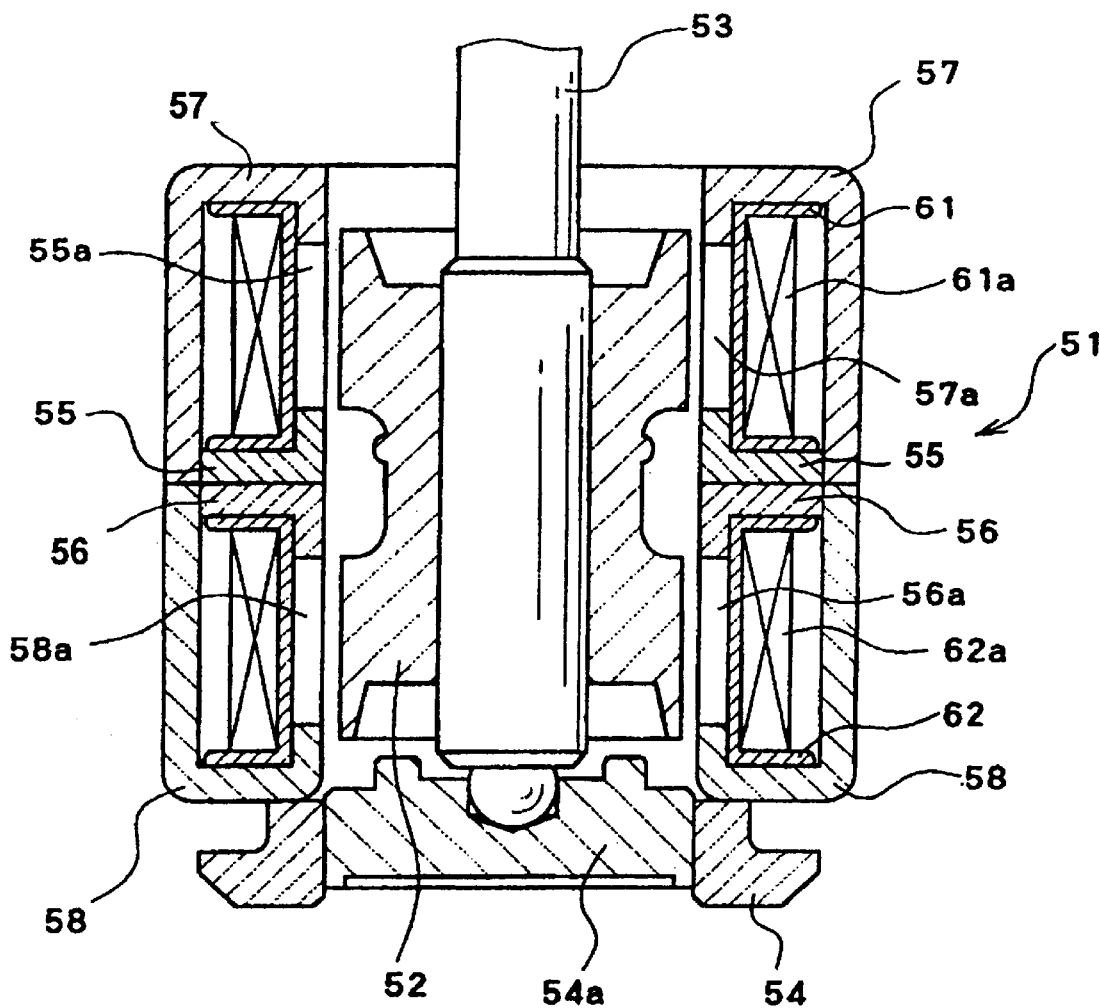
FIG. 4 shows a cross-sectional view of a stator that is a main portion of a conventional motor.
Figure 5:
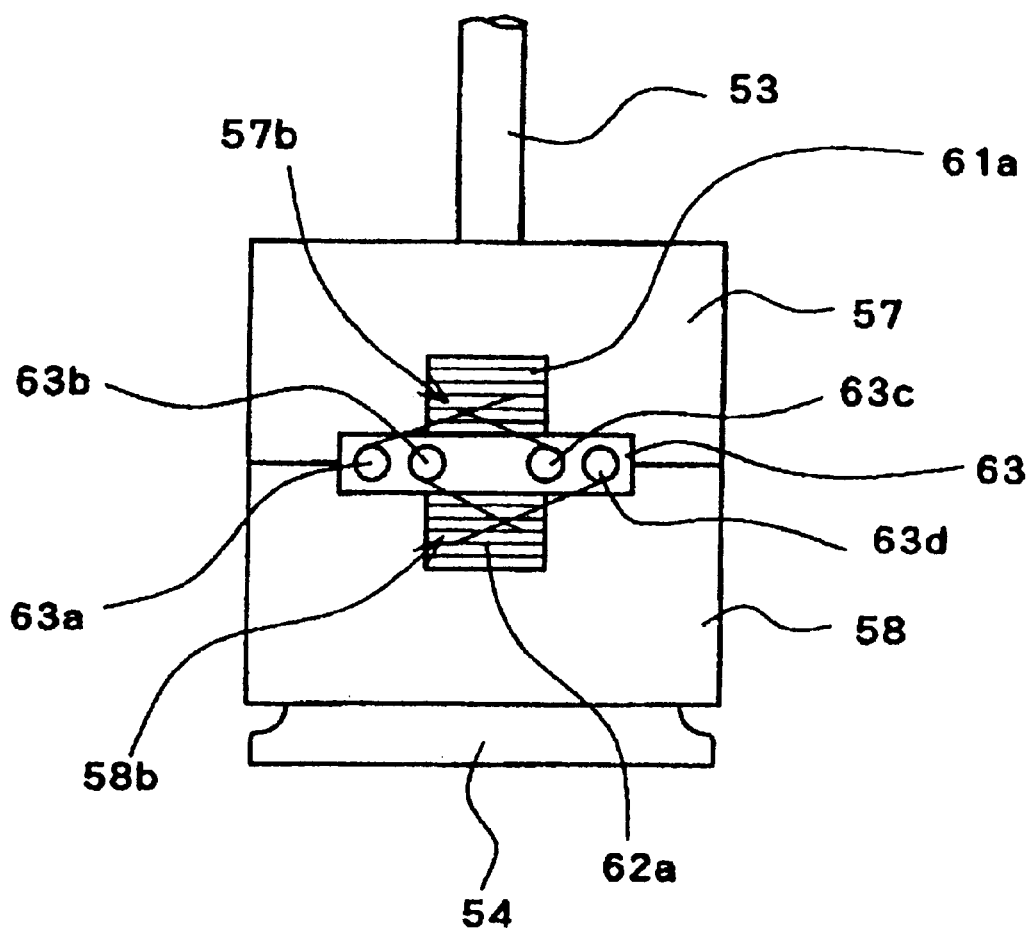
FIG. 5 shows an exterior view of a stator that is a main portion of a conventional motor.
Figure 6:
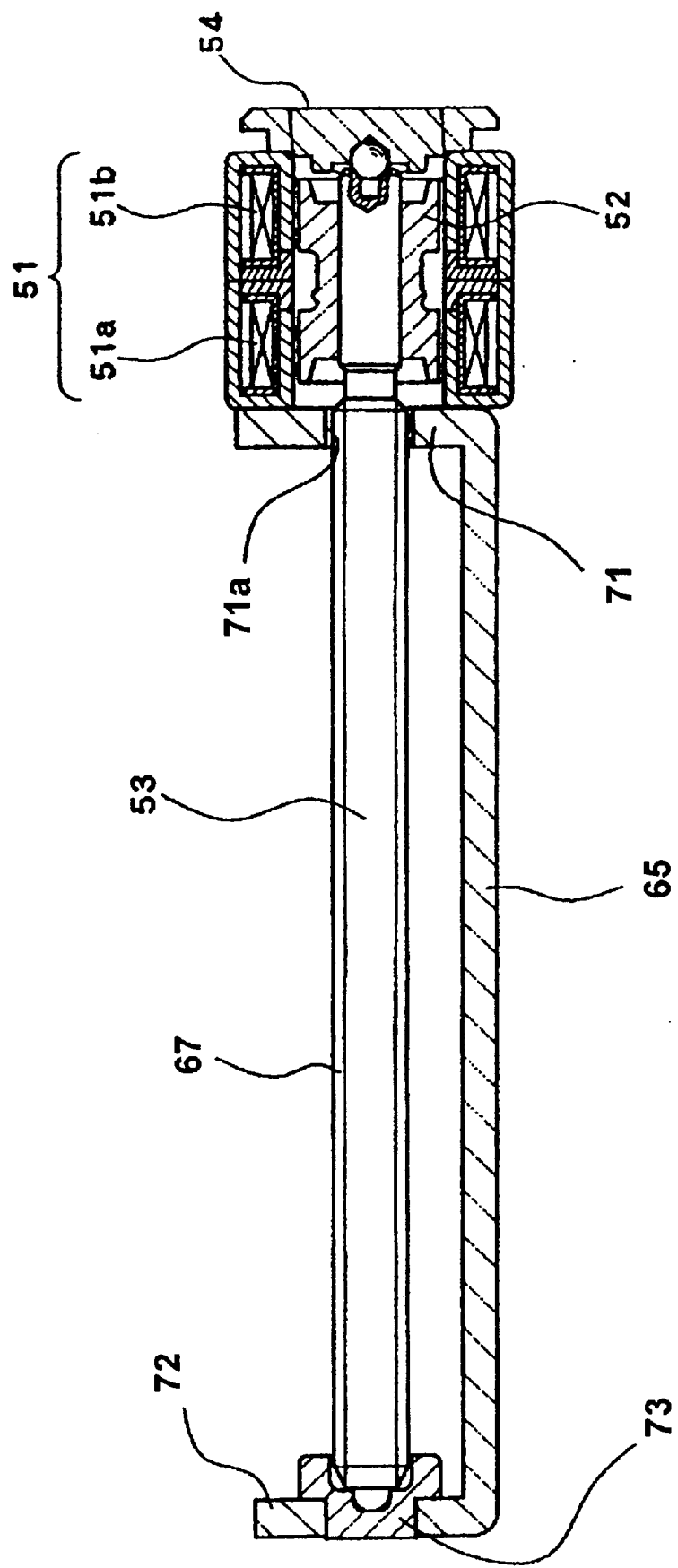
FIG. 6 shows a cross-sectional view of an entire structure of a conventional motor.
Figure 7:
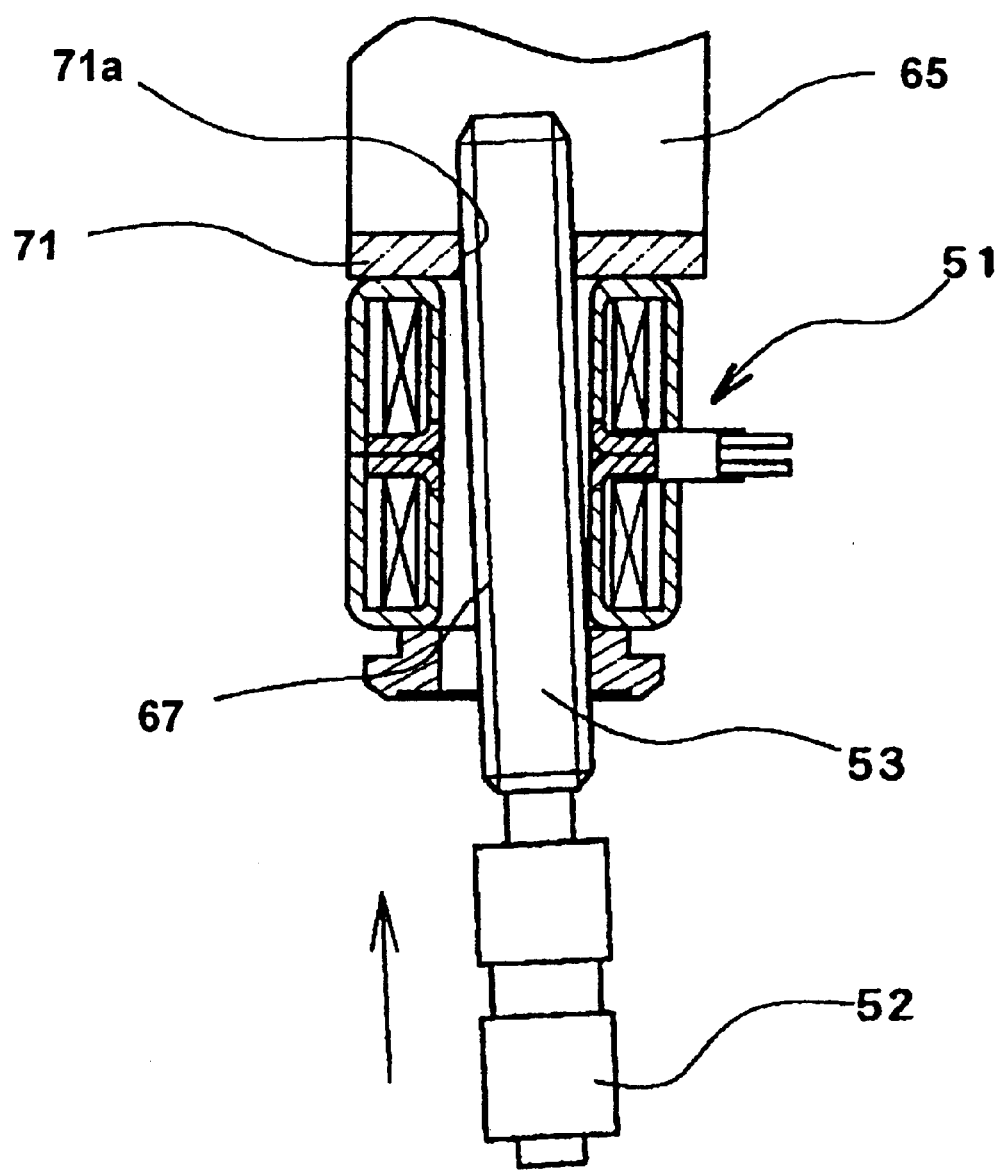
FIG. 7 shows a cross-sectional view of a conventional motor that is used to describe problems that may occur when the motor is assembled.

Embodiments of the present invention are described below. FIG. 1 shows a cross-sectional view of a motor in accordance with one embodiment of the present invention. FIG. 2 shows a prospective exploded view mainly showing a stator section that is the main portion of the embodiment of the present invention. FIG. 3 is a cross-sectional view taken along a line III—III in FIG. 1.

As shown in FIG. 1, the motor in accordance with the embodiment of the present invention has a stator 1, a rotor 2 disposed opposite to the stator 1, and a channel shaped frame 3 with one end thereof being affixed to the stator 1. A motor shaft 21 of the rotor 2 protrudes from one end of the stator 1, and an end section of the rotor shaft 21 is supported by the frame 3. It is noted that the motor of the present embodiment is a stepping motor. However, the present invention is not limited to stepping motors, but is also applicable to motors of other types.

The stator 1 has two coil sections 11 and 12 that are juxtaposed to each other in the axial direction. The rotor 2 is rotatably disposed inside the stator 1. Each of the coil sections 11 and 12, in their juxtaposed state, has an outer yoke 13 disposed on the outside of the stator 1 in the axial direction and an inner yoke 14 disposed on the inside of the stator 1 in the axial direction. In other words, the inner yokes 14 are disposed adjacent to each other. The yokes 13 and 14 are formed from magnetic metal members. Each of the yokes 13 and 14 has pole teeth 15 disposed on an internal peripheral side thereof opposite to an external peripheral surface of a magnet section 2a of the rotor 2.

The two pairs of the outer yokes 13 and the inner yoke 14 described above are formed with a coil bobbin in one piece by an insert forming method. A winding space for a winding 16 is provided between the outer yoke 13 and the inner yoke 14 in one of the pairs, and another winding space for a winding 17 is provided between the outer yoke 13 and the inner yoke 14 in the other of the pairs. The coil bobbin 18 is formed from a resin member, and has winding sections 19 and 20 disposed in the axial direction for winding the windings 16 and 17. The coil bobbin 18 also has an aperture section 24 in its internal peripheral wall that surrounds the periphery of the rotor 2. Surfaces of the pole teeth 15 are exposed through the aperture section 24 to the magnet section 2a of the rotor 2.

A cylindrical sleeve section 23 extends from an edge of the aperture section 24 to the left side in FIG. 1. The cylindrical sleeve section 23 is inserted in a passing aperture 31a formed in the frame 3. The cylindrical sleeve section 23 may be formed with the coil bobbin 18 in one piece. A convex section 23a is formed on an external peripheral surface of the cylindrical sleeve section 23, as shown in FIG. 2.

Also, a winding start section of the winding 16 that is wound around the winding section 19 of the coil bobbin 18 is connected to a terminal pin 22a that stands on a terminal section 22 (see FIG. 3). A winding end section of the winding 16 is connected to a terminal pin 22c that stands on the terminal section 22. A winding start section of the winding 17 that is wound around the winding section 20 of the coil bobbin 18 is connected to a terminal pin 22b that stands on a terminal section 22. A winding end section of the winding 17 is connected to a terminal pin 22d that stands on the terminal section 22. The terminal section 22 with the four terminal pins 22a–22d is formed with the coil bobbin 18 in one piece, and protrudes outwardly from the coil bobbin 18 in the radial direction of the coil bobbin 18.

The stator 1 has a cap section 25 that extends to the right hand side in FIG. 1. The cap section 25 has a circular aperture 25a that retains a bearing 41 that supports a rear end section (a right side end section in FIG. 1) of the rotor shaft 21 of the rotor 2. When the motor is assembled, the aperture 25a servers as an insertion opening section for inserting the rotor 2 that is formed with the rotor shaft in one piece into the stator 1. The cap section 25 having such a structure is formed with the coil bobbin 18 in one piece. The aperture 25a of the cap section 25 continuously communicates with the aperture section 24.

A spring pressure cap member 43 is mounted in the cap section 25. The spring pressure cap member 43 is equipped with a spring that abuts on the rear end of the bearing 41 to push the bearing 41 toward the frame 3. The spring pressure cap member 43 always applies a pushing force on the bearing 41 toward the frame 3 to thereby press the rotor shaft 21 of the rotor 2 against another bearing 42 provided on the other end of the frame 3 such that the rotation of the rotor 2 is stabilized.

A curled case 28 is placed over the external peripheries of the coil sections 11 and 12 of the stator 1, in other words, over the windings 16 and 17 that are wound around the coil bobbin 18. The curled case 28 may be formed by curling a flat metal plate in the peripheral direction of the stator 1. The curled case 28 has end sections 28a and 28b in the peripheral direction of the stator 1. When the curled case 28 is placed over the external peripheries of the coil sections 11 and 12 of the stator 1, the end sections 28a and 28b clamp the terminal section 22, such that, as shown in FIG. 3, the end sections 28a and 28b of the curled case 28 abut on both sides of the terminal section 22. In other words, an opening section is formed between the end sections 28a and 28b of the curled case 28, and the terminal section 22 protrudes from the opening section in the curled case 28. In one embodiment, the opening section of the curled case 28 opens through an opening arc angle of about one quarter (¼) of the entire periphery of a circle, which is about 90 degrees.

In the present embodiment, the curled case 28 is formed in an arc shape in its cross section with about 270-degree arc angle. Preferably, the curled case 28 may be formed in an arc shape having at least one half of the entire periphery (in other words, with at least 180-degree arc angle) or greater. In other words, the opening angle of the opening section of the curled case 28 may preferably be less than one half of the entire periphery of a circle (in other words, less than 180 degrees). When the opening angle of the opening section of the curled case 28 is greater than one half of the entire periphery, the curled case 28 may fall out from the stator 1. When the opening angle of the opening section of the curled case 28 is less than one half of the entire periphery, the curled case 28 clamps the terminal section 22 that protrudes from the stator 1, such that the curled case 28 is retained on the outer side of the stator 1 without falling out. As a result, for example, when the curled case 28 is welded to the stator 1 to enforce the bonding between the curled case 28 and the stator 1, the welding work is readily performed.

In the present embodiment, the opening section opens through an arc angle of about 90 degrees in order to reduce leakage of magnetic flux through the opening section. However, when the motor is a small sized motor in which the stator 1 has an external diameter of about 6 mm, its motor characteristic is less likely influenced by the magnetic flux leakage through the opening section. Therefore, the opening section in such a small sized motor can have a slightly wider arc angle than the present embodiment. In a preferred embodiment, the opening section in such a small sized motor may open by about one third (⅓) of the entire periphery of a circle. Furthermore, the curled case 28 may be welded to the external peripheral sections of the inner yolks 14 by a laser welding. As a result, the motor characteristic of the small sized motor becomes generally the same as that of a motor of a type in which a casing covers the entire periphery of the motor.

If the opening section of the curled case 28 is made too narrow, the curled case 28 having the opening section does not substantially contribute to a reduction in the thickness of the stator 1 in the radial direction. In other words, the curled case 28 with the opening section does not make a substantial difference in the thickness of the stator 1 from a stator whose entire periphery is covered by a casing. When the opening section is widened, the curled case 28, having a circular cross section with a portion thereof being cut at the opening section, becomes thinner in the radial direction. As a result, the amount of a tip portion of the terminal section 22 that protrudes outwardly in the radial direction from the opening section of the curled case 28 can be reduced in the radial direction. As a result, the entire thickness of the motor in the radial direction at the terminal section 22 can be made thinner. In this respect, the opening section of the curled case 28 may preferably have an opening angle of at most one sixth (⅙) of the entire periphery of a circle (i.e., more than 60 degrees) or greater.

The curled case 28 may formed by curling a flat metal plate, such that the curled case 28 extends along the peripheral direction of the stator 1, and clipped onto the exterior of the stator 1. Accordingly, a complex mold is not required for forming the case 28 and the manufacture of the motor is made simpler. Furthermore, since the curled case 28 has a cylindrical shape with one portion thereof being cut, the stator can be made thinner in the radial direction compared to a stator having a casing that circles the entire periphery of the stator.

In the present embodiment, the curled case 28 is welded to the external peripheral sections of the inner yokes 14 by a laser welding or the like as a countermeasure to prevent the motor characteristic from deteriorating, which may be caused by magnetic flux leakage through the opening section. In one embodiment, the curled case 28 is welded to the inner yokes 14 at three locations. More specifically, the curled case 28 is welded to the inner yokes 14 at points A and C adjacent to the end sections 28a and 28b, respectively, and at a point C that is located about the center of the arc defined by the curled case 28, as shown in FIG. 3. in which the points A, B and C are generally evenly spaced from one another at an interval of about 110 degrees. As a result, the curled case 28 is strongly bonded to the stator 1. In addition, as the curled case 28 is bonded to the inner yokes 14, magnetic paths can be independently formed at the coil sections 11 and 12 that are juxtaposed to each other in the axial direction. As a result, the magnetic paths become more effective and function to supplement the motor characteristic that may be lowered by the magnetic flux leakage.

The metal frame 3 in a channel shape is affixed to one end face of the stator 1 (on the left side surface of the stator 1 in FIG. 1). The metal frame 3 is affixed to the stator 1 before the rotor 2 is mounted in the stator 1. The metal frame 3 has a first plane section 31 that serves as a fixing surface to be affixed to the stator 1 and a second plane section 32 disposed opposite to the first plane section 31. The first and second plane sections 31 and 32 extend in a direction generally perpendicular to the rotor shaft 21 of the rotor 2. The first and second plane sections 31 and 32 are connected to each other by a connection plane section 33 that extends in parallel with the rotor shaft 21.

The rotor 2 is rotatably disposed in the aperture section 24 of the stator 1. The rotor 2 has a magnet section 2a that is disposed opposite to the pole teeth 15 of the stator 1, a magnet section 2a and a metal rotor shaft 21 provided at a rotator center of the magnet section 2a. One end section of the rotor shaft 21 extends from one end of the magnet section 2a in the axial direction. A lead screw section 21a is formed on an outer periphery of the one end section of the rotor shaft 21 that protrudes from the magnet section 2a. The lead screw section 21a engages, for example, a screw section of a print head member or the like (not shown). As the lead screw section 21a is rotated, the head section can be moved left and right in FIG. 1 along the head screw section 21a.

The first plane section 31, which serves as a fixing surface to be affixed to the stator 1, has a passing aperture 31a for passing the rotor shaft 21 of the rotor 2. The cylindrical sleeve section 23 of the stator 1 extends into the passing aperture 31a. The cylindrical sleeve section 23 of the stator 1 may be pressure-inserted in the passing aperture 31a to thereby affix the frame 3 to the stator 1. Also, a circular hole is formed in the second plane section 32 of the frame 3, and a bearing 42 for supporting the end of the rotor shaft 21 is fixedly retained in the circular hole in the second plane section 32.

The cylindrical sleeve section 23 of the stator 1 can prevent damage that might otherwise be inflicted on the rotor shaft 21 by the frame 3 when the rotor 2 is inserted in the stator 1 with the lead screw section 21a being introduced as a leading section into the aperture section 24 from the side of the cap section 25 of the stator 1. In a conventional structure, when the rotor is inserted in the stator, a lead screw section may contact an internal peripheral section of the passing aperture formed in the frame, and may be damaged by the frame. However, in accordance with the embodiment of the present invention, the cylindrical sleeve section 23, which extends in the passing aperture 31a of the metal frame 3 that is affixed to the stator 1, is formed from a material that has a lower hardness than that of the lead screw section 21a of the rotor shaft 21. In one embodiment, the cylindrical sleeve section 23 is formed with the coil bobbin 18 that is formed from a resin member in one piece, and placed in the passing aperture 31a of the metal frame 3. Therefore, when the lead screw section 21a is inserted through the passing aperture 31a of the metal frame 3 with its center being eccentric with respect to the center of the passing aperture 31a, the lead screw section 21a may contact the cylindrical sleeve section 23 that has a lower hardness but does not contact the passing aperture 31a of the metal frame 3. Since no damage is inflicted on the lead screw section 21a by the cylindrical sleeve section 23, excessive noise during sliding engagement with a head (not shown), which may be otherwise generated by damage inflicted on the lead screw section 21a, is prevented.

A concave section 31b is formed in the internal peripheral surface of the passing aperture 31a of the frame 3. The concave section 31b matches with the convex section 23a that is formed on the external peripheral surface of the cylindrical sleeve section 23. As a result, the frame 3 is affixed to the stator 1 with a high positional precision. In other words, the convex section 23a serves as a positioning section when the frame 3 is affixed to the stator 1, and also serves as a rotation stopper for the frame 3 and the stator 1 after the frame 3 and the stator 1 are affixed to one another.

In accordance with one embodiment of the present invention, as shown in FIG. 1, the cylindrical sleeve section 23 has a length slightly longer than the length of the passing aperture 31a in the axial direction. As a result, the internal peripheral surface of the passing aperture 31a formed in the metal frame 3 is completely covered by the cylindrical sleeve section 23 and is not exposed at all. Accordingly, when the rotor 2 is assembled, the passing aperture 31a of the metal frame 3 would not inflict any damage on the lead screw section 21a formed on the rotor shaft 21.

The rotor 2 is assembled in the stator 1 with the lead screw section 21a being introduced as a leading end into the aperture section 24 from the side of the cap section 25 of the stator 1. In other words, the tip of the rotor shaft 21 of the rotor 2 on the side of the lead screw section 21a is passed through the aperture 25a of the cap section 25, the aperture section 24 and the cylindrical sleeve section 23 that is provided at the edge of the aperture section 24, and the rotor 2 is inserted in the stator 1 until the tip of the rotor shaft 21 abuts on the bearing 42 that is retained in the second plane section 32 of the frame 3.

Then, in the state in which the rotor 2 is placed in the stator 1, the bearing 41 is inserted in the aperture 25a of the cap section 25, and the spring pressure cap member 43 is mounted over the cap section 25 with the spring of the spring pressure cap member 43 abutted on the rear end of the bearing 41. In the manner described above, the motor is assembled. When current is supplied to the windings 16 and 17 of the stator 1 of the motor thus assembled, the rotor 2 that is supported by the bearings 41 and 42 rotates about the rotor shaft 21 while the rotor 2 is pushed toward the frame 3. As a result of the rotation, the lead screw section 21a rotates and a head member (not shown) engaging the lead screw section 21a moves in the axial direction.

A preferred embodiment of the present invention is described above. However, the present invention is not limited to the embodiment described above, and many modifications can be made without departing the subject matter of the present invention. For example, in the above-described embodiment, the opening section of the curled case opens by about 90 degrees, and the curled case 28 is welded by a laser welding at three locations, i.e., adjacent to the end sections 28a and 28b and at the center of the curled case 28. However, the opening section can be opened wider or narrower than the embodiment. Also, in the above-described embodiment, the curled case 28 is welded to the inner yokes 14. However, in accordance with another embodiment, the curled case 28 may be additionally welded to the outer yokes 13. Furthermore, the curled case 28 may be welded at two locations adjacent to the end sections without welding at the center of the curled case 28, or may be welded at four or more locations along the periphery of the curled case 28 at equal intervals.

Also, the cylindrical sleeve section 23 that extends in the passing aperture 31a formed in the metal frame 3 may not be formed with the coil bobbin 18 in one piece. Instead, the cylindrical sleeve section 23 may be formed from an independent member that may be inserted in a central surface section of the outer yolk 13 of magnetic metal on the side of the metal frame 3 (at the base section of the pole teeth 15). Also, the cylindrical sleeve section 23 may not be formed from a resin member if the cylindrical sleeve section 23 is formed from a material that is softer than the lead screw section 21a.

Also, the cylindrical sleeve section 23 may have a measurement in the axial direction that is not longer than but equal to that of the passing aperture 31a, or may be shorter than the measurement in the axial direction of the passing aperture 31a. In one embodiment, the axial measurement of the cylindrical sleeve section 23 can be relatively short as long as the lead screw section 21a does not contact the internal peripheral surface of the passing aperture 31a when the rotor 2 is inserted with the rotor shaft 21 being tilted. Such an axial measurement of the cylindrical sleeve section 23 can be varied depending on relations between the axial measurement of the stator 1 and the diameter and the length of the passing aperture 31a. However, when the passing aperture 31a is completely covered by the cylindrical sleeve section 23, any risk of contact between these members can be eliminated.

As described above, in accordance with the present invention, a motor has a stator including a coil bobbin with winding sections to be wound by windings and a terminal section that outwardly protrudes in a radial direction of the coil bobbins and has fixed protruded terminal pins that are to be connected to winding start sections and wiring end sections of the windings. A motor case is formed from a curled metal plate that extends along a peripheral direction of the stator and is placed over an exterior of the windings of the stator. The curled case has end sections in the peripheral direction and an opening section defined by the end sections of the curled case. The terminal section protrudes through the opening section, and the opening section may open at an opening arc angle of less than one half of the entire periphery of a circle (i.e., less than 180 degree). As a result, the curled case is readily retained by, for example, external peripheral sections of the yokes when it is placed over the stator. The curled case can be readily affixed to the yokes by, for example, welding or the like.

Also, the curled case is welded to external peripheral sections of the metal yokes that are disposed between the winding sections of the coil bobbin, and the opening section may have an opening arch angle of less than one third (⅓) of the entire periphery of a circle to thereby narrow the opening section. As a result, magnetic circuits are more effectively formed, and a higher motor characteristic can be obtained.

The opening section of the curled case may preferably have an opening arc angle of greater than one sixth (⅙) of the entire periphery of a circle to thereby maintain a relatively wide opening in the curled case. As a result, the motor case has a cross-sectional configuration in which an outer peripheral portion thereof is partially removed. Such a cross-sectional configuration contributes to a reduction in the thickness in the radial direction of the motor including the terminal section that protrudes through the opening section.

In accordance with the present invention, a motor comprises a stator and a rotor disposed opposite to the stator, the rotor having a rotor shaft that protrudes from at least one end of the stator and is supported by a frame that is affixed to one end face of the stator provided in the axial direction of the stator. The frame has a fixing surface to be affixed to the stator and the fixing surface of the frame has a passing aperture. In one aspect of the invention, a cylindrical sleeve section for passing the rotor shaft is provided at an edge of the aperture formed in the stator, and the cylindrical sleeve section of the stator is inserted in the passing aperture. Further, the cylindrical sleeve section is formed from a material that has a hardness lower than that of the rotor central shaft.

As a result, when the rotor is placed in the stator, the rotor shaft can be prevented from contacting the passing aperture of the frame. Also, even when the rotor shaft contacts the cylindrical sleeve section that extends in the passing aperture of the frame, the rotor shaft is not damaged because the cylindrical sleeve section is formed from a material that has a lower hardness than that of the rotor shaft. Also, even when the rotor shaft contacts the cylindrical sleeve section, metal powder is not generated. Therefore, for example, a lead screw section formed on the rotary shaft can avoid such metal powder. This would prevent various problems such as noise and malfunctions that may be caused by metal powder adhering to the lead screw section while the lead screw section is driven.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A motor comprising;
   a stator;
   a rotor disposed in the stator, the rotor having a rotor shaft that protrudes from at least one end of the stator;
   a metal frame that supports the rotor shaft and that is affixed to one end face of the stator provided in the axial direction of the stator, the frame having a fixing surface to be affixed to the stator and a passing aperture in the fixing surface for passing the rotor shaft; and
   a cylindrical sleeve section for passing the rotor shaft provided at an edge of an aperture in the stator, wherein the cylindrical sleeve section extends into the passing aperture, and wherein the cylindrical sleeve section is formed from a material that has a lower hardness than that of the rotor shaft.

2. A motor according to claim 1, wherein the cylindrical sleeve section has an axial length generally identical with an axial length of the passing aperture in the axial direction.

3. A motor according to claim 1, wherein the cylindrical sleeve section has an axial length greater than an axial length of the passing aperture in the axial direction.

4. A motor according to claim 1, wherein the cylindrical sleeve section has a convex section provided on an external surface thereof to engage a concave section provide in the frame to thereby position the stator with respect to the frame.

5. A motor comprising:
   a stator having a coil bobbin comprising a resin member and an aperture section;
   a rotor disposed opposite to the aperture section of the stator, the rotor having a metal rotor shaft that protrudes from at least one end of the stator;
   a metal frame that supports the rotor shaft and affixed to one end face of the stator provided in the axial direction of the stator, the frame having a fixing surface to be affixed to the stator and a passing aperture for passing the rotor shaft, the passing aperture being disposed in a manner to overlap the aperture section of the coil bobbin for passing the rotary shaft; and
   a yoke having pole teeth disposed opposite to the rotor, the yoke being assembled with the coil bobbin in one piece by an insert forming method, wherein the coil bobbin has a cylindrical sleeve section that is inserted in the passing aperture of the metal frame and formed integrally with the coil bobbin by a resin member at an edge of the aperture section of the stator.

6. A motor according to claim 5, wherein the metal frame includes a first plane section that is affixed to one end face of the stator in the axial direction and a second plane section disposed opposite to the first plane section, wherein the rotor shaft protrudes from one side of the aperture section of the stator, passes through the aperture section and a passing aperture that is formed in the first plane section, and is supported by a bearing provided in the second plane section of the frame.

7. A motor according to claim 5, wherein the cylindrical sleeve section has a measurement in the axial direction that is generally identical or greater than a measurement of the passing aperture in the axial direction.

8. A motor according to claim 5, wherein the cylindrical sleeve section has a convex section provided on an external surface thereof such that the convex section serves as a positioning section to be used when the frame is affixed to the stator.

9. A motor comprising:
   a stator assembly; and
   a frame; wherein the frame includes structure at a first end configured to hold a first end of a rotor shaft, and wherein the frame includes structure that defines a passing aperture configured for passage of the rotor shaft at a second end opposite the first end of the frame;
   wherein the stator assembly includes a sleeve section that defines a sleeve aperture configured for passage of the rotor shaft; and
   wherein the sleeve section is configured for insertion in the passing aperture of the frame so that the sleeve aperture lies inside the passing aperture of the frame.

10. The motor of claim 9, wherein the sleeve aperture of the sleeve section has an axial length that is generally the same as am axial length of the passing aperture of the frame.

11. The motor of claim 9, wherein the sleeve aperture of the sleeve section has an axial length that is greater than the axial length of the passing aperture of the frame.

12. The motor of claim 9, wherein an outer surface of the sleeve section has a convex section configured to engage a concave section in the frame to position the stator with respect to the frame.

13. The motor of claim 9, wherein the structure of the sleeve section that defines the sleeve aperture is formed of a material that has a lower hardness than that of the rotor shaft.

14. The motor of claim 13, wherein the structure of the sleeve section that defines the sleeve aperture is a resin material and the rotor shaft is formed of a metal.

15. The motor of claim 9, wherein the stator assembly includes a coil bobbin and wherein the sleeve section formed integrally with the coil bobbin.

* * * * *